US011293763B2

United States Patent
Li et al.

(10) Patent No.: US 11,293,763 B2
(45) Date of Patent: Apr. 5, 2022

(54) SYSTEMS AND METHODS FOR DETERMINING NEW ROADS ON A MAP

(71) Applicant: BEIJING DIDI INFINITY TECHNOLOGY AND DEVELOPMENT CO., LTD., Beijing (CN)

(72) Inventors: Mengxi Li, Beijing (CN); Wei Shao, Beijing (CN); Tingting Song, Beijing (CN); Maozong Zheng, Beijing (CN); Pengfei Xu, Beijing (CN); Kaiqiang An, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/894,771

(22) Filed: Jun. 6, 2020

(65) Prior Publication Data

US 2020/0300641 A1 Sep. 24, 2020

Related U.S. Application Data

(63) Continuation of application No. PCT/CN2017/114761, filed on Dec. 6, 2017.

(51) Int. Cl.
*G01C 21/32* (2006.01)
*G06K 9/00* (2006.01)
(Continued)

(52) U.S. Cl.
CPC ......... *G01C 21/32* (2013.01); *G06K 9/00476* (2013.01); *G06K 9/629* (2013.01);
(Continued)

(58) Field of Classification Search
CPC .... G06N 3/088; G06N 7/005; G06K 9/00798; G06K 9/6256; G06T 2207/20084
See application file for complete search history.

(56) References Cited

U.S. PATENT DOCUMENTS

| 6,285,393 | B1* | 9/2001 | Shimoura | ............ G05D 1/0246 348/119 |
| 7,359,555 | B2 | 4/2008 | Porikli et al. | |

(Continued)

FOREIGN PATENT DOCUMENTS

| CN | 104851099 A | 8/2015 |
| CN | 104915636 A | 9/2015 |

(Continued)

OTHER PUBLICATIONS

Teerapong Panboonyuen et al., Road Segmentation of Remotely-Sensed Images Using Deep Convolutional Neural Networks with Landscape Metrics and Conditional Random Fields, Remote Sensing, 9(7), 2017, 19 pages.

(Continued)

*Primary Examiner* — Yosef Kassa
(74) *Attorney, Agent, or Firm* — Metis IP LLC

(57) ABSTRACT

A method configured to implemented on at least one map processing device for determining new roads on a map includes obtaining a first road network image of a region, the first road network image including a first plurality of roads. The method also includes determining a second road network image of the region based on a map of the region, the second road network image including a second plurality of roads that are not present in the first road network image. The method further includes determining a third road network image by concatenating the first road network image and the second road network image. The method still further includes determining a fourth road network image of the (Continued)

region by processing the third road network with at least one convolution layer, the fourth road network including the second plurality of roads.

20 Claims, 10 Drawing Sheets

(51) Int. Cl.
  *G06K 9/62* (2006.01)
  *G06T 3/40* (2006.01)
  *G06T 5/50* (2006.01)
(52) U.S. Cl.
  CPC .............. *G06K 9/6256* (2013.01); *G06T 3/40* (2013.01); *G06T 5/50* (2013.01); *G06T 2207/20061* (2013.01); *G06T 2207/20081* (2013.01); *G06T 2207/20084* (2013.01); *G06T 2207/20212* (2013.01)

(56) References Cited

U.S. PATENT DOCUMENTS

| | | | | |
|---|---|---|---|---|
| 7,444,003 | B2* | 10/2008 | Laumeyer | G06K 9/00818 348/169 |
| 7,813,822 | B1* | 10/2010 | Hoffberg | H04N 21/44222 700/94 |
| 7,979,172 | B2* | 7/2011 | Breed | G08G 1/161 701/23 |
| 8,121,350 | B2* | 2/2012 | Klefenz | G06T 7/73 382/104 |
| 8,306,733 | B2 | 11/2012 | Shikimachi | |
| 8,504,233 | B1* | 8/2013 | Ferguson | G05D 1/0289 701/23 |
| 8,516,266 | B2* | 8/2013 | Hoffberg | G05B 19/042 713/189 |
| 8,725,342 | B2* | 5/2014 | Ferguson | G06K 9/00798 701/23 |
| 8,798,372 | B1* | 8/2014 | Korchev | G06K 9/00637 382/195 |
| 8,938,094 | B1 | 1/2015 | Kehl et al. | |
| 8,958,911 | B2* | 2/2015 | Wong | B25J 9/1694 700/258 |
| 9,187,099 | B2* | 11/2015 | Powers | B60W 30/00 |
| 9,704,068 | B2 | 7/2017 | Mnih et al. | |
| 2016/0140425 | A1 | 5/2016 | Kulkarni et al. | |
| 2017/0259801 | A1 | 9/2017 | Abou-Nasr et al. | |
| 2017/0344879 | A1 | 11/2017 | Merhav et al. | |
| 2019/0094027 | A1 | 3/2019 | Xu et al. | |

FOREIGN PATENT DOCUMENTS

| | | |
|---|---|---|
| CN | 105488534 A | 4/2016 |
| CN | 105512661 A | 4/2016 |
| CN | 106934456 A | 7/2017 |
| CN | 107145578 A | 9/2017 |
| CN | 107170004 A | 9/2017 |
| CN | 207221007 A | 9/2017 |
| WO | 2017040691 A1 | 3/2017 |

OTHER PUBLICATIONS

Shunta Saito et al., Multiple Object Extraction from Aerial Imagery with Convolutional Neural Networks, Society for imaging Science and Technology, 2016, 9 pages.
International Search Report in PCT/CN2017/114761 dated Aug. 23, 2018, 4 pages.
Written Opinion in PCT/CN2017/114761 dated Aug. 23, 2018, 4 pages.

* cited by examiner

SYSTEMS AND METHODS FOR DETERMINING NEW ROADS ON A MAP

CROSS-REFERENCE TO RELATED APPLICATIONS

This application is a continuation of International Application No. PCT/CN2017/114761, filed on Dec. 6, 2017, the contents of which are incorporated herein by reference.

TECHNICAL FIELD

The present disclosure relates generally to systems and methods for image segmentation, and more particularly, to systems and methods for image segmentation based on deep convolutional neutral network (DCNN).

BACKGROUND

Map-based digital navigation and on-demand services have become increasingly popular. However, maps used for navigation or on-demand service need to be updated frequently to keep up with the fast pace of city development (e.g., new roads construction). Conventional semantic image segmentation, which is used for processing maps and obtaining detailed information about maps, presents difficulties in identifying new roads on a map. Thus, there is a need for systems and methods that can be used to determine new roads on a map accurately and efficiently.

SUMMARY

In an aspect of the present disclosure, a system may include at least one computer-readable storage medium including a set of instructions and at least one processor in communication with the at least one computer-readable storage medium. When executing the instructions, the at least one processor may be directed to obtain a first road network image of a region, the first road network image including a first plurality of roads; determine a second road network image of the region based on a map of the region with a trained deep convolution neural network (DCNN) model, the second road network image including a second plurality of roads that are not present in the first road network image; determine a third road network image of the region by concatenating the first road network image and the second road network image, the third road network image including information of the first road network image and the second road network image; and determine a fourth road network image of the region by processing the third road network with at least one convolution layer, the fourth road network including the second plurality of roads.

In some embodiments, the at least one processor may be further directed to change the first plurality of roads in the first road network image from a first width to a second width, wherein the first plurality of roads and the second plurality of roads in the second road network image have the second width.

In some embodiments, to obtain the trained DCNN model, the at least one processor may be directed to: obtain a preliminary DCNN model; obtain a plurality of maps and a plurality of road network images corresponding the plurality of maps; train the preliminary DCNN model based on the plurality of maps and the plurality of road networks; and determine the trained DCNN model based on the preliminary DCNN model and a loss function.

In some embodiments, the at least one convolution layer may be part of the trained DCNN model.

In some embodiments, the trained DCNN model may include one or more pairs of convolution layer and pooling layer, at least one atrous convolution layer, one or more deconvolution layers, and one or more skip layers.

In some embodiments, the trained DCNN model may include: one or more atrous convolution layers configured to improve the resolution of a feature image from a first value to a second value; and one or more skip layers configured to combine two feature images into one combined feature image.

In some embodiments, wherein to combine the two feature images into the one combined feature image, the first skip layer may be configured to: combine the two feature images into the one combined feature image element-by-element.

In some embodiments, the one combined feature image may include features of both the two feature images.

In some embodiments, the size of the second road network image may be same as the size of the first road network image.

In some embodiments, to determine the third road network image of the region by concatenating the first road network image and the second road network image, the at least one processor may be directed to determine the third road network image by inputting the first road network image and the second road network image into a concatenation layer of the trained DCNN model.

In some embodiments, the at least one processor may be further directed to: determine two ends of each of the second plurality of roads based on the fourth road network image; and determine coordinates of the two ends according to a Hough transform.

In another aspect of the present disclosure, a method implemented on at least one map processing device for determining roads on a map. The method may include obtaining, by the at least one map processing device, a first road network image of a region, the first road network image including a first plurality of roads; determining, by the at least one map processing device, a second road network image of the region based on a map of the region with a trained deep convolution neural network (DCNN) model, the second road network image including a second plurality of roads that are not present in the first road network image; determining, by the at least one map processing device, a third road network image of the region by concatenating the first road network image and the second road network image, the third road network image including information of the first road network image and the second road network image; and determining, by the at least one map processing device, a fourth road network image of the region by processing the third road network with at least one convolution layer, the fourth road network including the second plurality of roads.

In a further aspect of the present disclosure, a non-transitory medium storing instructions, the instructions, when executed by at least one map processing device, causing the at least one map processing device to implement a method. The method may include obtaining a first road network image of a region, the first road network image including a first plurality of roads; determining a second road network image of the region based on a map of the region with a trained deep convolution neural network (DCNN) model, the second road network image including a second plurality of roads that are not present in the first road network image; determining a third road network image of the region by concatenating the first road network image and the second road network image, the third road network image including information of the first road network image and the second road network image; and determining a fourth road network image of the region by processing the third road network with at least one convolution layer, the fourth road network including the second plurality of roads.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
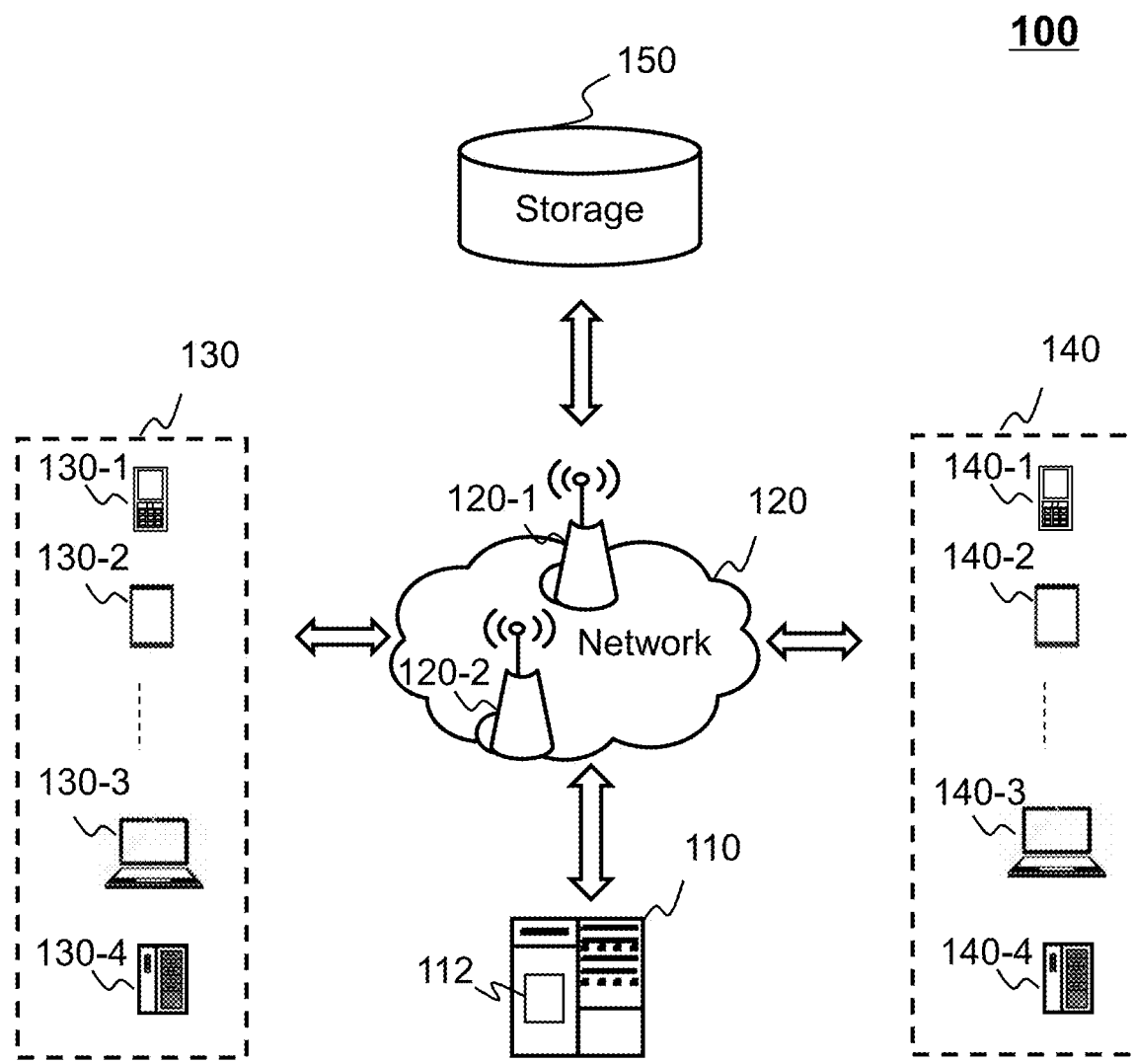
FIG. 1 illustrates an exemplary network environment of a map processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for purposes of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to determine a new road network image, it should also be understood that the present disclosure is not intended to be limiting. The system or method of the present disclosure may be applied to any other applications, such as, a contour line determination from a remote sensing image, etc. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The terms "passenger," "requestor," "service requestor," and "user" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The terms "request for a service," "requests," "order," and "service order" in the present disclosure are used interchangeably to refer to a request that may be initiated by a passenger, a service requestor, a user, a driver, a provider, a service provider, or the like, or any combination thereof. The service request may be accepted by any one of a passenger, a service requestor, a user, a driver, a provider, or a service provider. The service request may be chargeable or free.

The term "driver device" in the present disclosure is used to refer to a mobile terminal that is used by a service provider to provide a service or facilitate the providing of the service. The term "terminal device" in the present disclosure is used to refer to a mobile terminal that is used by a service requestor to request or order a service.

It should be noted that the new roads determination in the present disclosure, which may be used in map applications, or on-demand services, such as online taxi hailing, is a newly emerged service rooted in post-Internet era. It provides technical solutions to users that could rise only in post-Internet era. In the pre-Internet era, newly reconstructed roads are updated manually. The manual updating process is time consuming. However, the map processing system described in the present disclosure is able to determine new roads in forms of road network images automatically based on historical road network images and current maps or high-resolution aerial images. The system may determine new roads of a certain region in a very short time. Therefore, through Internet, the map processing system may provide a more accurate and efficient way to determine new roads that may never be met in a traditional pre-Internet scenario.

The present disclosure is directed to systems and methods for determining new roads on a map. New roads on a map may be determined based on a historical road network that may not include the new roads. At least a deep convolutional neural network may be provided for performing one or more operations, such as a convolution operation, a concatenation operation, on the historical road network and the map to identifying the new roads.

The terms "road map", "map," and "map image," in the present disclosure are used interchangeably to refer to an image of a map which includes roads and point of interests (e.g., buildings, mountains, etc.) in a region. Also, the term "road network," and "road network image" in the present disclosure are used interchangeably to refer to an image of a road network which includes a plurality of interconnected roads in a region. In addition, the machine learning models or one or more layers of the machine learning models in the present disclosure, unless specified, may be trained according to certain embodiments described, for example, in FIG. 9 and the descriptions thereof.

FIG. 1 illustrates an exemplary network environment of a map processing system according to some embodiments of the present disclosure. The map processing system 100 may be an online service platform for providing map related services. The map processing system 100 may include a server 110, a network 120, a user terminal 130, a driver device 140, and a storage 150. The map processing system 100 may further include a positioning device 170 (not shown in FIG. 1).

The map processing system 100 may provide a plurality of services. Exemplary services may include a map update service, a navigation service, an on-demand service (e.g., a taxi hailing service, a chauffeur service, an express car service, a carpool service, a bus service, or a driver hire service), or the like, or a combination thereof.

The server 110 may process map-related data and/or information from one or more components of the map processing system 100 or an external data source (e.g., a cloud data center). The server 110 may communicate with the user terminal 130 and/or the driver device 140 to provide various functionality of online services. In some embodiments, the server 110 may be a single server, or a server group. The server group may be a centralized server group connected to the network 120 via an access point, or a distributed server group connected to the network 120 via one or more access points, respectively. In some embodiments, the server 110 may be locally connected to the network 120 or in remote connection with the network 120. For example, the server 110 may access information and/or data stored in the user terminal 130, the driver device 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented in a computing device 200 having one or more components illustrated in FIG. 2 in the present disclosure.

In some embodiments, the server 110 may include a processing engine 112. The processing engine 112 may process information and/or data related to one or more functions described in the present disclosure. In some embodiments, the processing engine 112 may perform main functions of the map processing system 100. In some embodiments, the processing engine 112 may process maps to determine new roads on the maps. For example, the map processing system may determine a road network image including new roads based on a road map using a machine learning model. In some embodiments, the processing engine 112 may perform other functions (e.g., map updating) related to the method and system described in the present disclosure.

In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the map processing system 100 (e.g., the server 110, the user terminal 130, the driver device 140, the storage 150) may send information and/or data to other component(s) in the map processing system 100 via the network 120. For example, the processing engine 112 may obtain a plurality of road network images from the storage 150 via the network 120. As another example, the processing engine 112 may transmit new roads determined on a map to the user terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the map processing system 100 may be connected to the network 120 to exchange data and/or information.

The user terminal 130 and/or the driver device 140 may communicate with the server 110 via the network 120. In some embodiments, a passenger may be an owner of the user terminal 130. In some embodiments, the owner of the user terminal 130 may be someone other than the passenger. For example, an owner A of the user terminal 130 may use the user terminal 130 to send a service request for a passenger B, and/or receive a service confirmation and/or information or instructions from the server 110. In some embodiments, a driver may be a user of the driver device 140. In some embodiments, the user of the driver device 140 may be someone other than the driver. For example, a user C of the driver device 140 may use the driver device 140 to receive a service request for a driver D, and/or information or instructions from the server 110. In some embodiments, a driver may be assigned to use one of the driver device 140 for at least a certain period of time. For example, when a driver is available to provide an on-demand service, he/she may be assigned to use a driver terminal that receives the earliest request and a vehicle that is recommended to perform the type of on-demand service. In some embodiments, "passenger" and "terminal device" may be used interchangeably, and "driver" and "driver device" may be used interchangeably. In some embodiments, the driver device 140 may be associated with one or more drivers (e.g., a night-shift driver, a day-shift driver, or a driver pool by a random shifting).

A passenger may receive new roads on a map via the user terminal 130. In some embodiments, the user terminal 130 may obtain a road map from the processing engine 112 via the network 120. The user terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, an onboard built-in television, a built-in tablet, etc. In some embodiments, the user terminal 130 may include a signal transmitter and a signal receiver configured to communicate with the positioning device 170 for locating the position of the passenger and/or the user terminal 130, and determining a relative distance from his/her position to a road.

The driver may also receive new roads on a map via the driver device 140. The driver device 140 may obtain new roads from the processing engine 112 via the network 120. The driver device 140 may include a plurality of driver devices 140-1, 140-2, . . . , 140-n. In some embodiments, the driver device 140 may be similar to, or same as the user terminal 130. In some embodiments, the driver device 140 may be customized to implement online services based on maps obtained from the processing engine 112.

The storage 150 may store data and/or instructions. The data may include data related to road maps, road networks, passengers, drivers, and/or external environment. Merely for illustration purposes, data related to road maps may include electronic maps, a photo of a paper map, an aerial photography, a remote sensing image, etc. Data related to passengers may include user profiles. Data related to the drivers may include driver profiles. Data related to external environment may include weather conditions, road features, etc. In some embodiments, the storage 150 may store data obtained from the user terminal 130 and/or the driver device 140. For example, the storage 150 may store log information associated with the user terminal 130.

In some embodiments, the storage 150 may store data and/or instructions that the processing engine 112 may execute to process maps or map-related images as described in the present disclosure. In some embodiments, data storage 160 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, one or more components in the map processing system 100 may access the data or instructions stored in the storage 150 via the network 120. In some embodiments, the storage 150 may be directly connected to the server 110 as a backend storage.

The positioning device 170 may determine information associated with an object, for example, one or more of the user terminal 130, the driver device 140, etc. For example, the positioning device 170 may determine a current location of the user terminal 130. In some embodiments, the positioning device 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information provided by the positioning device 170 may include a location, an elevation, a velocity, or an acceleration of the object, and/or a current time. The location may be in the form of coordinates, such as, a latitude coordinate and a longitude coordinate, etc. The positioning device 170 may include or associate with one or more satellites. The satellites may determine the information mentioned above independently or jointly. The positioning device 170 may send the information mentioned above to the user terminal 130, or the driver device 140 via the network 120.

One of ordinary skill in the art would understand that when an element of the map processing system 100 performs, the element may perform through electrical signals and/or electromagnetic signals. For example, when a user terminal 130 processes a task, such as determining new roads, the user terminal 130 may operate logical circuits in its processor to process such task. When the user terminal 130 sends out an image (e.g., a road map) to the server 110, a processor of the user terminal 130 may generate electrical signals encoding the image. The processor of the user terminal 130 may then send the electrical signals to an output port. If the user terminal 130 communicates with the server 110 via a wired network, the output port may be physically connected to a cable, which further transmit the electrical signal to an input port of the server 110. If the user terminal 130 communicates with the server 110 via a wireless network, the output port of the user terminal 130 may be one or more antennas, which convert the electrical signals to electromagnetic signals. Similarly, a driver device 140 may process a task through operation of logical circuits in its processor, and receive an instruction and/or information from the server 110 via electrical signals or electromagnet signals. Within an electronic device, such as the user terminal 130, the driver device 140, and/or the server 110, when a processor thereof processes an instruction, sends out an instruction, and/or performs an action, the instruction and/or action is conducted via electrical signals. For example, when the processor retrieves data (e.g., road networks) from a storage medium (e.g., the storage 150), it may send out electrical signals to a read device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
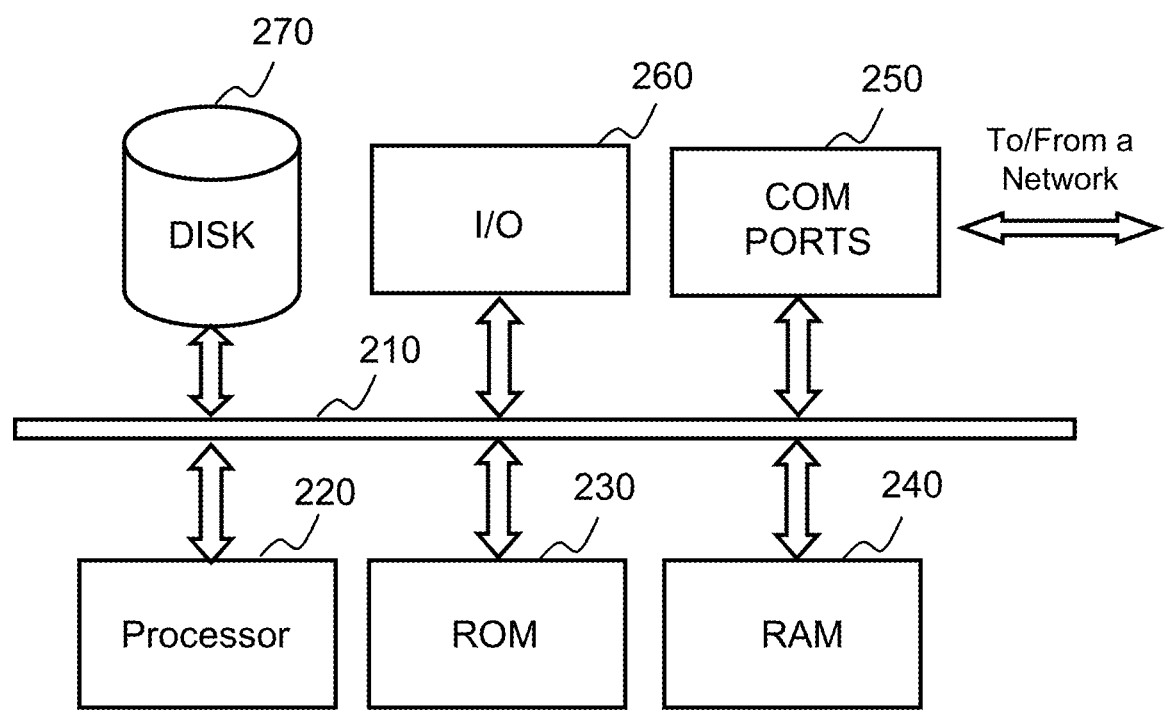
FIG. 2 illustrates an exemplary computing device on which the map processing system can be implemented according to some embodiments of the present disclosure.

FIG. 2 illustrates an exemplary computing device 200 on which the map processing system can be implemented according to some embodiments of the present disclosure.

The computing device 200 may be a general purpose computer or a special purpose computer. Both may be used to implement the map processing system of the present disclosure. The computing device 200 may be used to implement any components of the services as described herein. For example, the processing engine 112 may be implemented on the computing device 200, via its hardware, software program, firmware, or a combination thereof. Although only one such computer is shown for convenience, the computer functions related to the service as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a ROM 230, or a RAM 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 also includes an I/O component 260, supporting input/output between the computer, the user, and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B)

Figure 3:
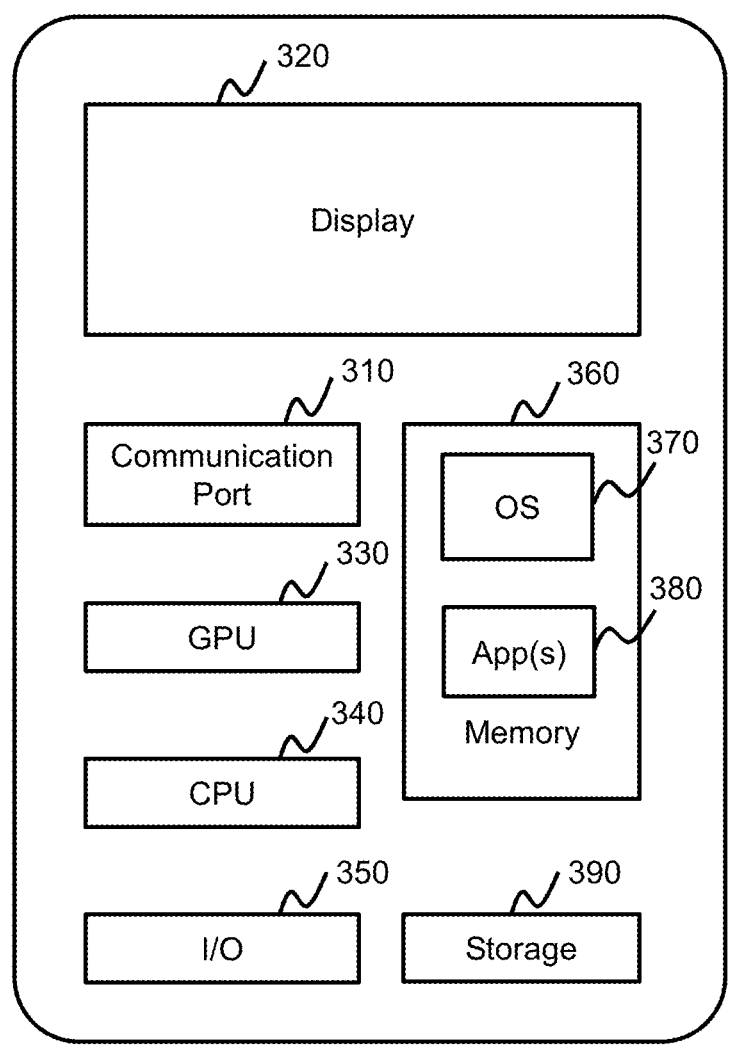
FIG. 3 illustrates an exemplary mobile device on which the on-line services can be implemented according to some embodiments of the present disclosure.

FIG. 3 illustrates an exemplary mobile device on which the on-line services can be implemented, according to some embodiments of the present disclosure. As illustrated in FIG. 3, the mobile device 300 may include a communication port 310, a display 320, a graphic processing unit (GPU) 330, a CPU 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser, a map application, or any other suitable mobile apps for transmitting, receiving and presenting information relating to a service order (e.g., a plurality of names associated with an address text) from the processing engine 112 and/or the storage 150. User interactions with the information stream may be achieved via the I/O 350 and provided to the processing engine 112 and/or other components of the on-demand service system 100 via the network 120.

Figure 4:
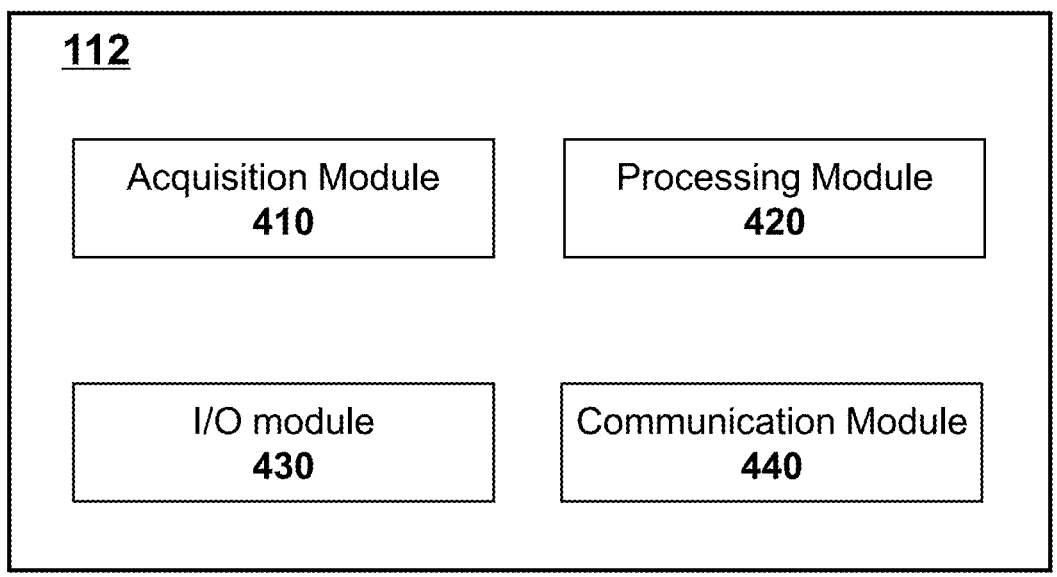
FIG. 4 illustrates an exemplary processing engine according to some embodiments of the present disclosure.

FIG. 4 illustrates an exemplary processing engine 112 according to some embodiments of the present disclosure. The processing engine 112 may include an acquisition module 410, a processing module 420, an I/O module 430, and a communication module 440. One or more modules of the processing engine 112 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

The acquisition module 410 may be configured to conduct data acquisition. In some embodiments, the acquisition module 410 may acquire various types of data. Merely by ways of example, the acquired data may include map images, road network images, machine learning models (e.g., a DCNN model), hyper-parameters of machine learning models, user instructions, programs, algorithms, or the like, or a combination thereof. In certain embodiments, a map image may be used as an overview of major routes and features of a region. In some embodiments, the terms "map," and "map image," in the present disclosure are used interchangeably. The map images may be an electronic map, a photograph of a paper map (e.g., a printed map, a hand-drawn paper map), an aerial map, a remote sensing map, or the like. In some embodiments, the map image may include a plurality of roads and point of interests (e.g., educational institutions, tourism sites, hospitals, shops, restaurants, hotels, air ports, train stations, etc.). As used herein, the term "road", unless specified, refers road illustrated on a map or map image. A road network image may refer to an image including a plurality of roads, which are represented by lines. In some embodiments, the term "road network," and "road network image" in the present disclosure are used interchangeably. In some embodiments, the map processing system 100 may generate a road network image based on a map. In some embodiments, a road network image may include one or more road features such as coordinates of two ends of a road, road length, road width, road safety, traffic light, traffic flow, road maintenance, road type (highway, service road, one-way street, two-way street, etc.), etc. The acquisition module 410 may acquire data from a storage device (e.g., the storage 150), a terminal device (e.g., the user terminal 130, the driver device 140, etc.), an external source (e.g., a cloud data center, etc.), or the like.

The processing module 420 may be configured to process data related to map images and/or road network images. The processing module 420 may obtain or receive data and/or information from the acquisition module 410, the storage module 430, and/or any storage devices capable of storing data (e.g., storage 150, or an external data source). In some embodiments, the processing module 420 may obtain or receive a primary machine learning model (e.g., a deep convolutional neural network (DCNN) model), and train the machine learning model to determine a trained model. The processing module 420 may use the trained model to determine a road network image based on a map image. In some embodiments, the processing module 420 may perform various operations on map images and/or road network images to determine new roads on the road map images and/or the road network images. For example, the various operations may include convolution operation, deconvolution operation, concatenation operation, image enhancement, or the like, or a combination thereof.

The processing module 420 may include a hardware processor, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

The I/O module 430 may be configured to enable a user to interact with the processing engine 112. In some embodiments, a user may set hyper-parameters including, for example, learning rate, and/or mini-batch size, via the I/O module 430 to train a machine learning model. As another example, the I/O module 430 may output information (e.g., one or more network images of new roads, a request message for choosing a map image) to a user.

The I/O module 430 may also include an input device and an output device. Examples of the input device may include a control panel, a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication module 440 may be configured to connect the processing engine 112 to a network (e.g., network 150) to facilitate data communication. The communication module 440 may establish connections between the processing engine 112 and the user terminal 130, the driver device 140, the storage 150, and/or an external information source. The connection may be a wired connection, a wireless connection, any other communication connection that can enable information transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, or 5G), or the like, or a combination thereof. In some embodiments, the communication module 440 may be and/or include a standardized communication port, such as RS232, RS485, etc. In some embodiments, the communication module 440 may be a specially designed communication port.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. For example, the processing engine 112 may further include a storage module facilitating data storage. However, those variations and modifications do not depart from the scope of the present disclosure.

Figure 5:
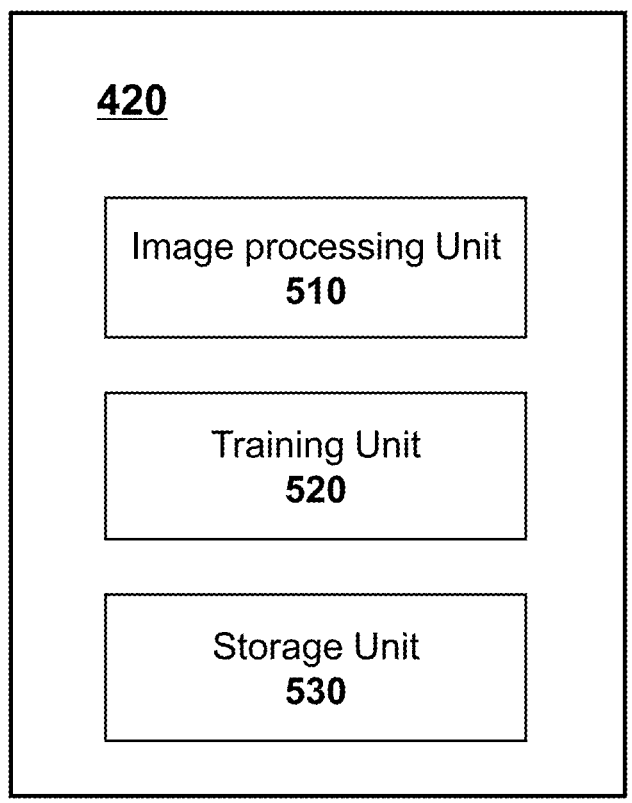
FIG. 5 is a block diagram of an exemplary processing module according to some embodiments of the present disclosure.

FIG. 5 is a block diagram of an exemplary processing module 420 according to some embodiments of the present disclosure. As illustrated in FIG. 5, The processing module 420 may include an image processing unit 510, a training unit 520, and a storage unit 530. In some embodiments, one or more units of the processing module 420 may be implemented by at least one processor, such as the processor 220.

The image processing unit 510 may be configured to process a map image and/or a road network image. In some embodiments, the image processing unit 510 may determine a road network image. For example, the image processing unit 510 may obtain a map from the acquisition module 410, and obtain a trained DCNN model from the training unit 520. The image processing unit 510 may generate a road network image by processing the map with the trained DCNN model.

In some embodiments, the image processing unit 510 may process a road map or a road network image by performing various operations to determine new roads on the road map image or the road network image. The various operations may include convolution operations, deconvolution operations, concatenation operations, pooling operations, image enhancement operations (e.g., histograms enhancement, contrast enhancement, etc.), or the like, or a combination thereof. For example, the image processing unit 510 may perform a convolution operation on a map to extract main features (e.g., road information) from the map. As another example, the image processing unit 510 may perform a concatenation operation on two road network images to generate another road network image including information of both the two road network images. As still another example, the image processing unit 510 may perform a contrast enhancement operation to help identifying different types of roads on a map.

The training unit 520 may be configured to train a machine learning model. In some embodiments, the machine learning model may include a regression model, a neural network model, a maximum likelihood estimation model, or the like. In some embodiments, the machine learning model may include a DCNN model. The DCNN model may be used to generate a road network image based on a map image. In some embodiments, the training unit 520 may obtain a preliminary DCNN model, and determine a trained DCNN model based on the preliminary DCNN model. The preliminary DCNN model may be set by a user, determined according to default settings of map processing system 100, or a combination of both.

In some embodiments, the training unit 520 may obtain training data from the acquisition module 410, and train the DCNN model based on the training data. The training data may include, for example, a plurality of road map images and a plurality of road network images corresponding to the road map images. In some embodiments, the training unit 520 may train the DCNN model in an iterative process.

The storage unit 530 may be configured to store data related to the determination of new roads. The data may be obtained from the processing module 420, the user terminal 130, the driver device 140, the storage 150, one or more external information source (e.g., a cloud data center), and/or any other component of the map processing system 100. The storage unit 530 may store various data including, for example, programs, codes, algorithms, road maps, road network images, machine learning models, and/or hyperparameters of a machine learning model. The storage unit 530 may also store computer instructions executed by one or more units of the processing module 420 to perform one or more functions described in the present disclosure.

Figure 6:
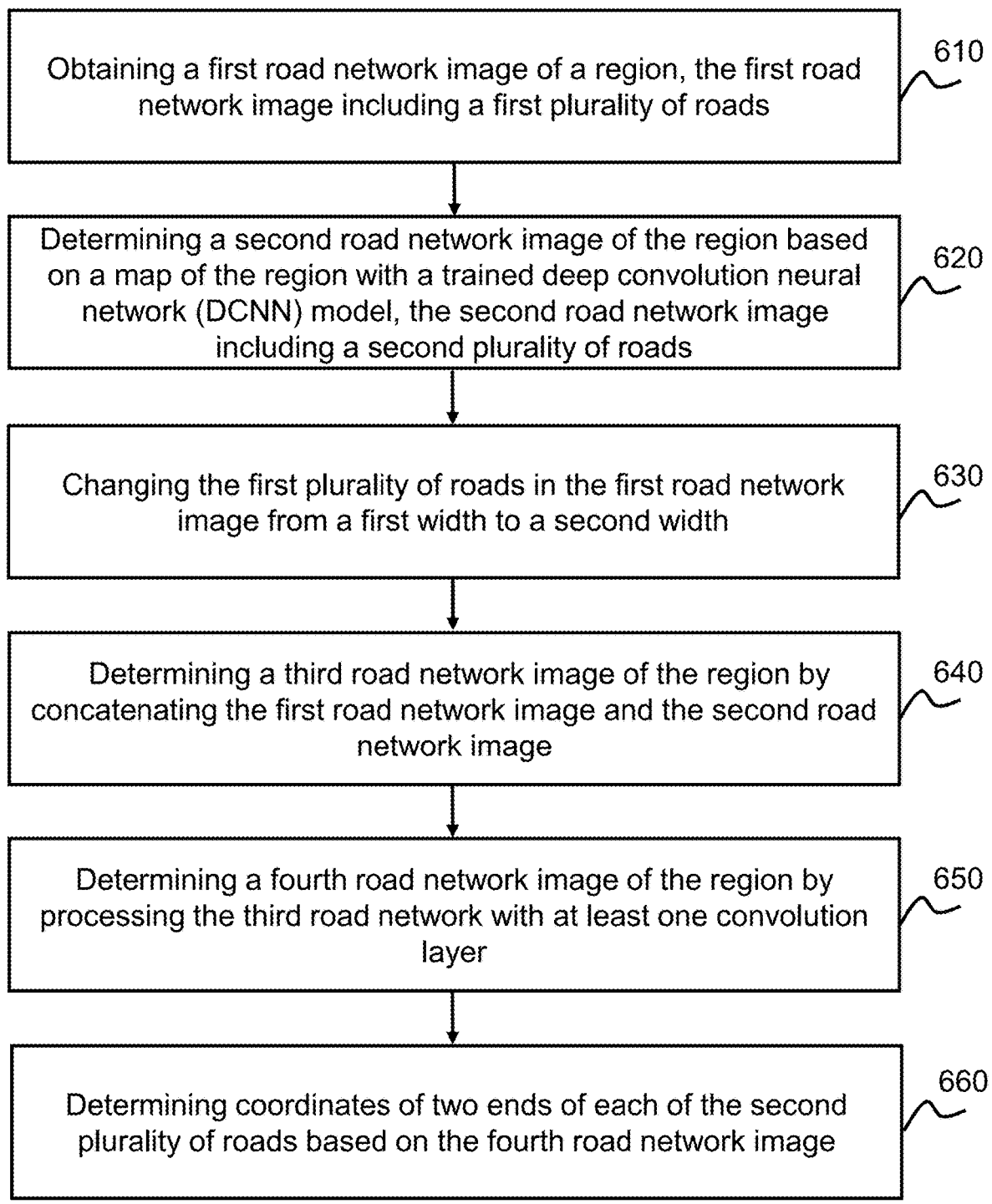
FIG. 6 illustrates a flowchart of an exemplary process for determining new roads according to some embodiments of the present disclosure.

FIG. 6 illustrates a flowchart of an exemplary process 600 for determining new roads on a map according to some embodiments of the present disclosure. In some embodiments, the process 600 may be executed by the map processing system 100. For example, the process 600 may be implemented as a set of instructions stored in a non-transitory storage medium of the server 110. The processor 220 may execute the set of instructions and perform the steps in the process 600 accordingly.

In 610, a first road network image of a region may be obtained. In some embodiments, the first road network image may be obtained by the acquisition module 410. The first road network image may include a first plurality of roads. In some embodiments, the first plurality of roads may not include new roads such as but not limited to newly constructed roads and newly modified roads (e.g., expansion of roads). Merely for illustration purposes, the first road network image may be generated based on a map, for example, an older version map. The region illustrated in the first road network image may refer to any geographical area. For example, the region may be a continent, a country, a province, a state, a shire, a city, a town, a district, a community, a school, a factory, a park, etc.

In some embodiments, the first road network image may include a first plurality of roads. Each of the first plurality of roads in the first road network image may be represented by a line of a certain width. In some embodiments, the lines representing the first plurality of roads may have a similar width. In some embodiments, the lines representing the first plurality of roads may have different widths. For example, a width of a line may be determined according to a width of a real road corresponding to the line.

In 620, a second road network image of the region may be determined based on a map of the region with a trained DCNN model. In some embodiments, the acquisition module 410 may obtain a map image of the region. The map may be an electronic map, a photograph of a paper map (e.g., a printed map, a hand-drawn paper map), an aerial map, a remote sensing map, or the like. In some embodiments, the map may be a road map, which may include all or part of the routes of the region. In some embodiments, the map may further include a plurality point of interests (e.g., educational institutions, tourism sites, hospitals, shops, restaurants, hotels, air ports, train stations, etc.). In some embodiments, the map image of the region may be a latest version.

In some embodiments, a trained DCNN model may be obtained to process the map images. In certain embodiments, the trained DCNN model may be obtained from the training unit 520. A second road network image may be determined by processing the map image with a DCNN model. The DCNN model may process the road map with a plurality of layers, such as convolution layers, deconvolution layers, pooling layers, atrous layers, etc. In some embodiments, details regarding the DCNN model may be described elsewhere in the present disclosure, for example, FIGS. 8 and 9, and the descriptions thereof. The second road network image may have a certain size. In some embodiments, the second road network image may have a same size as the first road network image. For example, both the second road network image and the first road network image may have a size of 256×256. The size 256×256 may represent 256 pixels in width and 256 pixels in height. As another example, both the second road network image and the first road network image may have a size of 9×9 cm. The size 9×9 cm may represent 9 cm in width and 9 cm in height.

The second road network image may include at least a second plurality of roads. The second plurality of roads in the second road network image may correspond to new roads (e.g., newly constructed roads, modified or reconstructed road, etc.) that are not present in the first road network image. In some embodiments, the second road network image may include part or all of the first plurality of roads and the second plurality of roads. Each of the second plurality of roads in the second road network image may also be represented by a line of a certain width. In some embodiments, the lines representing the first plurality of roads and the lines representing the second plurality of roads may have a same width. In some embodiments, the lines representing the second plurality of roads and the lines representing the second plurality of roads may have different widths. For example, the lines representing the second plurality of roads may have a larger width than the lines representing the first plurality of roads.

In 630, the first plurality of roads in the first road network image may be changed from a first width to a second width. The widths of the lines representing the first plurality of roads may be changed by, for example, the image processing unit 510. In some embodiments, the first width may be larger than the second width. The image processing unit 510 may shrink the first plurality of roads to the second widths. In some embodiments, the first width may be smaller than the second width. The image processing unit 510 may expand the first plurality of roads to the second widths. In some embodiments, the widths of the first plurality of roads in the first road network image may be changed according to an image morphological algorithm, such as an expansion algorithm, a fast parallel algorithm, etc. In some embodiments, the second plurality of roads in the second road network image may also have the second width. In some embodiments, after being processed (e.g., by the image processing unit 510), the width of the first plurality of roads in the first network image is the same as the width of the second plurality of roads in the second road network image.

In 640, a third road network image of the region may be determined by concatenating the first road network image (after being processed in 630) and the second road network image. The third road network image of the region may be determined by, for example, the image processing unit 510. In some embodiments, the image processing unit 510 may perform a concatenation operation or input the first road network image and the second road network image into a concatenation layer of a neural network (e.g., the trained DCNN model) to implement the third road network image determination. The third road network image may include information of both the first road network image and the second road network image. The information may include various types of road features, such as but not limited to relative position of a road in the road network image, road length, road width, etc.

In some embodiments, the size of the third road network image may be determined according to the size of the first road network image and/or the size of the second road network image. In some embodiments, if both the first road network image and the second road network image have a same predetermined size, the third road network image may also have the predetermined size. Merely for illustration purposes, both the first road network image and the second road network image may have a size of 256×256. Each of the first road network image and the second road network image may correspond to a matrix of 256*256*2, which indicates that the first road network image and the second network image may store information in two channels. Then the third road network image may correspond to a matrix of 256*256*4, which indicates that the third road network image may store information in four channels. In certain embodiments, information of both the first road network image and the second road network image may be stored in the four channels of the third road network image; and the third road network image may have a size of 256×256.

In 650, a fourth road network image of the region may be determined by processing the third road network image with at least one convolution layer (e.g., of a DCNN model). The fourth road network image may be determined, for example, by the image processing unit 510. In some embodiments, the image processing unit 510 may determine the fourth road network image by processing the third road network image with a convolution layer and obtaining the processed results. The convolution layer may be provided by a neural network (e.g., the trained DCNN model). In some embodiments, the image processing unit 510 may determine the fourth road network image by performing a differentiation operation on the third road network image. In certain embodiments, the differentiation operation may process information of one or more channels of the third road network image, and remove same elements in the one or more channels. Merely for illustration purposes, the image processing unit 510 may remove the first plurality of roads from the third road network image. In some embodiments, the fourth road network image may include the second plurality of roads (i.e., the new roads).

In 660, coordinates of two ends of each of the second plurality of roads may be determined based on the fourth road network image. The coordinates of two ends of each of the second plurality of roads may be determined by, for example, the image processing unit 510. In some embodiments, a coordinate system may be established to facilitate the determination of the coordinates. Relative positions between two ends of each of the second plurality of roads and an origin of the coordinate system may be determined. In some embodiments, coordinates of two ends of each of the second plurality of roads may be determined according to the relative positions. In some embodiments, the coordinates may be expressed in forms of a latitude coordinate and a longitude coordinate. In some embodiments, coordinates of two ends of each of the second plurality of roads may be determined according to one or more algorithms. Merely by ways of example, the one or more algorithms may include a Hough transformation.

The operations of the process 600 are intended to be illustrative and not limiting. In some embodiments, the process 600 may be accomplished with one or more additional operations not described, and/or without one or more of the operations discussed. Additionally, the order in which the operations of the process 600 are performed is not intended to be limiting. For example, process 600 may further include transmitting the second road network image to the storage 150 or any other components in the map processing system 100 by the communication module 440. Similar modifications should fall within the scope of the present disclosure.

Figure 7:
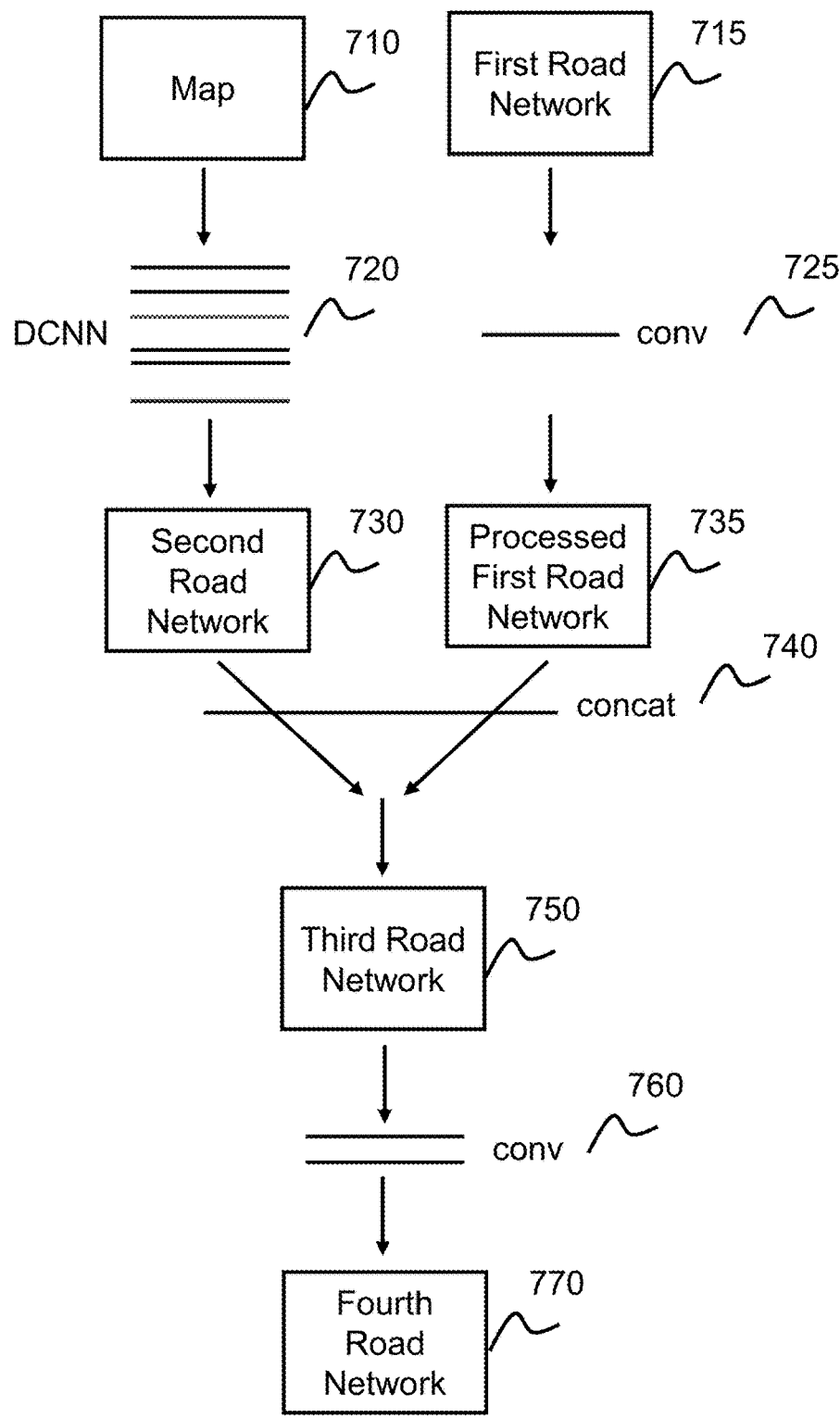
FIG. 7 illustrates a schematic diagram for determining a new road network image of a region based on a road network of the region and a map including the region according to some embodiments of the present disclosure.

FIG. 7 illustrates a schematic diagram 700 for determining new roads on a map according to some embodiments of the present disclosure. In some embodiments, the schematic diagram 700 may correspond to steps 610 through 650 illustrated in FIG. 6. The map processing system 100 may obtain a map 710 and a first road network 715. The first road network 715 may include a plurality of roads. In some embodiments, the first road network 715 may be generated based on an older version map. The map 710 may be a latest version that may further include one or more new roads such as but not limited to newly constructed roads and newly modified roads (e.g., expansion of roads) that are not present in the first road network 715. The map processing system 100 may process the map 710 and/or the first road network 715 with a plurality of layers of one or more neural networks. As illustrated in FIG. 7, the plurality of layers may include multiple layers of a DCNN model 720, a convolution layer 725, a concatenation layer 740, and a convolution layer 760.

The DCNN model 720 may be configured to determine a second road network based on a map. In some embodiments, the DCNN model may take a form of multiple layers of a neural network. The DCNN model 720 may process the map 710, and generate a second road network 730, as described in 620. In some embodiments, the second road network may have a similar size as the road map, and may reserve information of the map 710. The DCNN model 720 may have a certain network structure, such as ResNet-101, VGG-16, etc. An embodiment of a network structure of the DCNN model 720 may be disclosed in FIG. 8.

In some embodiments, the convolution layer 725 may be configured to process roads in the first road network 715. For example, the convolution layer 725 may obtain the first road network, and generate a processed first road network image 735. In certain embodiments, the convolution layer 725 may change the lines representing the roads in the first road network 715 from a first width to a second width. If the first width is larger than the second width, the convolution layer 725 may shrink the lines in the first road network 715. If the first width is smaller than the second width, the convolution layer 725 may expand the lines in the first road network 715.

In some embodiments, the concatenation layer 740 may be configured to combine two images and generate another image containing information of both the two images. For example, the concatenation layer 740 may obtain the second road network 730 and the processed first road network 735, and generate a third road network 750. In some embodiments, the concatenation layer 740 may obtain information of the second road network 730, the first road network 715, and the processed first road network 735, and store the obtained information separately in different channels.

The convolution layer 760 may be configured to generate a fourth road network 770 based on the third road network image 750. The convolution layer 760 may process information of one or more channels of the third road network 750, and remove same elements in the one or more channels. In some embodiments, the removal may be realized by performing a differentiation operation on the third road network 750. The fourth road network 770 may just include the new roads.

It should be noted that the above description is merely provided for the purposes of illustration, and not intended to limit the scope of the present disclosure. For persons having ordinary skills in the art, multiple variations and modifications may be made under the teachings of the present disclosure. For example, the convolution layer 725, the concatenation layer 740, and/or the convolution layer 760 may be a part of the DCNN model 720. However, those variations and modifications do not depart from the scope of the present disclosure.

Figure 8:
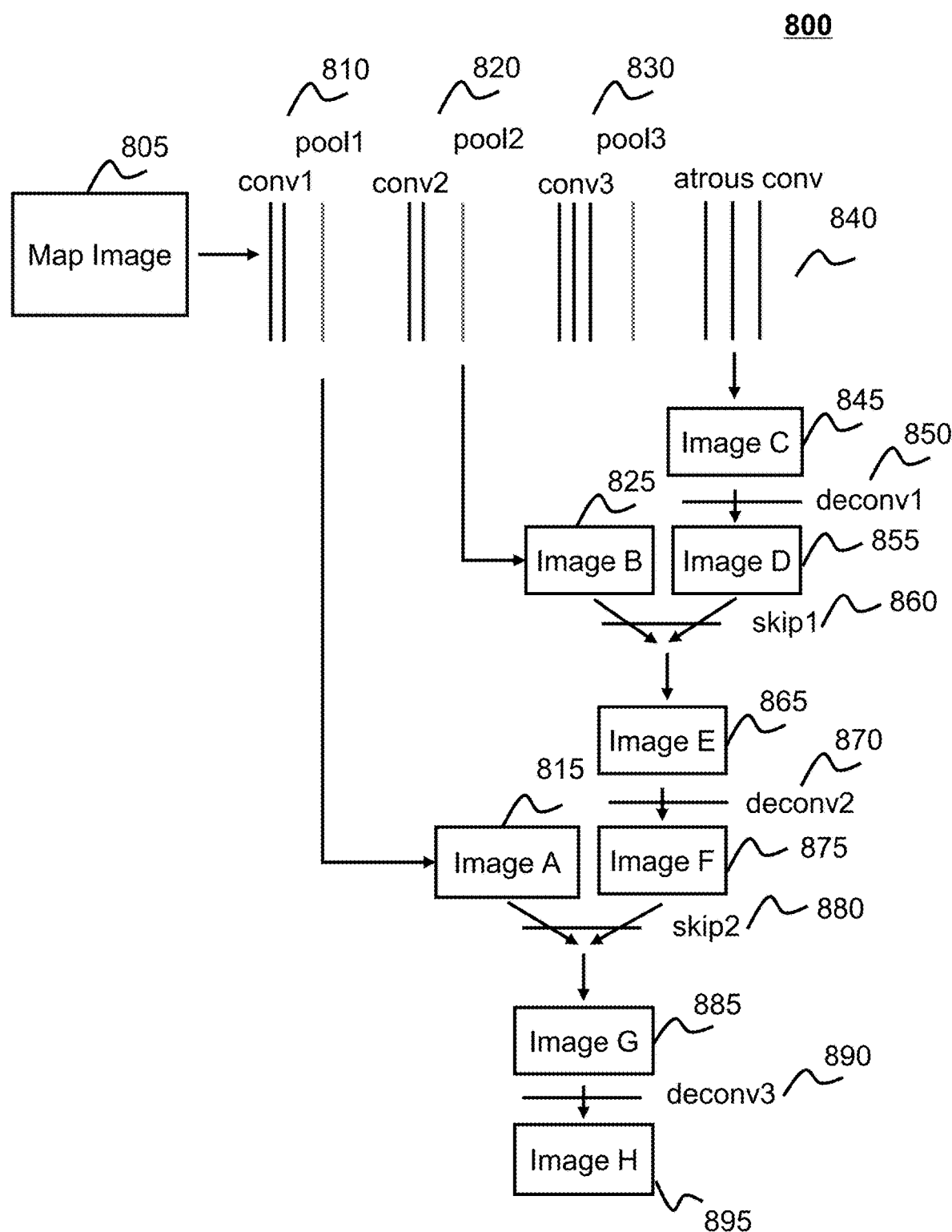
FIG. 8 is a schematic diagram illustrating an exemplary network structure of a DCNN model according to some embodiments of the present disclosure.

FIG. 8 is a schematic diagram illustrating an exemplary network structure of a DCNN model 800 according to some embodiments of the present disclosure. The DCNN model 800 may have various types of network structures, such as ResNet-101, VGG-16, etc. In FIG. 8, an exemplary network structure of VGG-16 is provided for the purposes of illustrating a DCNN model. Only presented as an example, the DCNN model 800 may include three pairs of convolution layer and pooling layer 810 through 830, an atrous convolution layer 840, three deconvolution layers 850, 870, and 890, and two skip layers 860 and 880. A skip layer may be configured to be configured to generate an image with a finer pixel based on at least two images.

The first pair of convolution layer and pooling layer 810 may be configured to generate a first feature image (also referred to as image A 815). The first pair of convolution layer and pooling layer 810 may obtain a map image 805 and generate an image A based on the map image 805. In some embodiments, the convolution layer may extract features from the map image 805. Specifically, the convolution layer may convolve the map image with a set of filters, and produce a plurality of feature images. The pooling layer may down-sample the feature images output from the convolution layer. Merely by ways of example, the pooling layer may utilize one or more pooling methods to down-sample the feature images. Exemplary pooling methods may include average pooling, maximum pooling, stochastic pooling, etc. The first pair of convolution layer and pooling layer 810 may extract one or more features of the map image 805 as well as reduce the size of the map image 805. For example, the size of the image A 815 may be one half the size of the map image 805.

The second pair of convolution layer and pooling layer 820 may be configured to further extract one or more features from the output (i.e., the image A 815) of the first pair of convolution layer and pooling layer 810, and generate a second feature image (also referred to as image B 825). In some embodiments, the second pair of convolution layer and pooling layer 820 may be similar to or the same as the first pair of convolution layer and pooling layer 810. Merely for illustration purposes, the size of the image B 825 may be one fourth the size of the map image 805.

The third pair of convolution layer and pooling layer 830 may be similar to or the same as the first pair of convolution layer and pooling layer 810 and/or the second pair of convolution layer and pooling layer 820. The third pair of convolution layer and pooling layer 830 may generate a third feature image (not shown in FIG. 8) based on the output (i.e., the image B 825) of the second pair of convolution layer and pooling layer 820. The size of the third image may be one eighth the size of the map image 805.

In some embodiments, the atrous convolution layer 840 may be configured to improve quality of an image. More particularly, the atrous convolution layer 840 may facilitate dense feature extraction, field of view enlargement, and/or resolution improvement of an image. In some embodiments, the atrous convolution layer 840 may obtain the output of the third pair of convolution layer and pooling layer 830 (i.e., the third image), and may generate a fourth feature image (also referred to as image C 845). The atrous convolution layer 840 may improve the resolution of the third image. Thus, the resolution of the image C may have a larger resolution and more features than the third image. In some embodiments, the atrous convolution layer 840 may or may not change the size of the input image. For example, the image C 845 may have a same size as the third image.

The first deconvolution layer 850 may be configured to up-sample an input image. In some embodiments, the first deconvolution layer 850 may obtain the output of the atrous convolution layer 840 (i.e., image C 845), and generate a fifth feature image (also referred to as image D 855). In some embodiments, the first deconvolution layer 850 may enlarge the image C 845. For example, the first deconvolution layer 850 may double the size of the image C 845. In certain embodiments, the size of the image D 855 may be one fourth the size of the map image 805.

The first skip layer 860 may be configured to combine two images into one image. In some embodiments, the first skip layer 860 may obtain the output of the first deconvolution layer 850 (i.e., the image D 855) and the output of the second pair of convolution layer and pooling layer 820 (i.e., the image B 825), and generate a sixth feature image (also referred to as image E 865). In certain embodiments, both the image D 855 and the image B 825 may have a same size. In some embodiments, the first skip layer 860 may combine the two images element-by-element. Specifically, arithmetic operations (e.g., product, sum, max, etc.) may be performed between each pixel in the image D 855 and each corresponding pixel in the image B 825. For example, the first skip layer 860 may add two pixels, which may correspond to each other in the two images, and generate a pixel of the image E 865. In certain embodiments, the image E 865 may include features of both the image B 825 and the image D 855. In some embodiments, the image generated by the first skip layer 860 may have a same size as the images input into the first skip layer 860. For example, the size of the image E 865 may be one fourth the size of the map image 805.

The second deconvolution layer 870 and the third deconvolution layer 890 may be similar to or the same as the first deconvolution layer 850. In some embodiments, the second skip layer 880 may also be similar to or the same as the first skip layer 860. In some embodiments, the second deconvolution layer 870 may be configured to obtain the output of the first skip layer 860 (i.e., the image E 865), and generate a seventh feature image (also referred to as image F 875). In certain embodiments, the size of the image F 875 may be one half the size of the map image 805. The second skip layer 880 may be configured to obtain the output of the second deconvolution layer 870 (i.e., the image F 875) and the output of the first pair of convolution layer and pooling layer 810 (i.e., the image A 815), and generate an eighth feature image (also referred to as image G 885). In some embodiments, the image G 885 may include features of both the image A 815 and the image F 875. In certain embodiments, the size of the image G 885 may be one half the size of the map image 805.

The third deconvolution layer 890 may be configured to obtain the output of the second skip layer 880 (i.e., the image G 885), and generate a ninth feature image (also referred to as image H 895). In certain embodiments, the image H 895 may be the output of the DCNN model 800. In certain embodiments, the image H 895 may have a same size as the map image 805. In some embodiments, the map image 805 may be similar to or the same as the map 710. The image H 895 may be the second road network 730 in connection with FIG. 7.

It should be noted that the above description is merely provided for the purposes of illustration, and not intended to limit the scope of the present disclosure. For persons having ordinary skills in the art, multiple variations and modifications may be made under the teachings of the present disclosure. For example, the DCNN model 800 may further include a fourth pair of convolution layer and pooling layer, a third skip layer, and/or a fourth deconvolution layer. However, those variations and modifications do not depart from the scope of the present disclosure.

Figure 9:
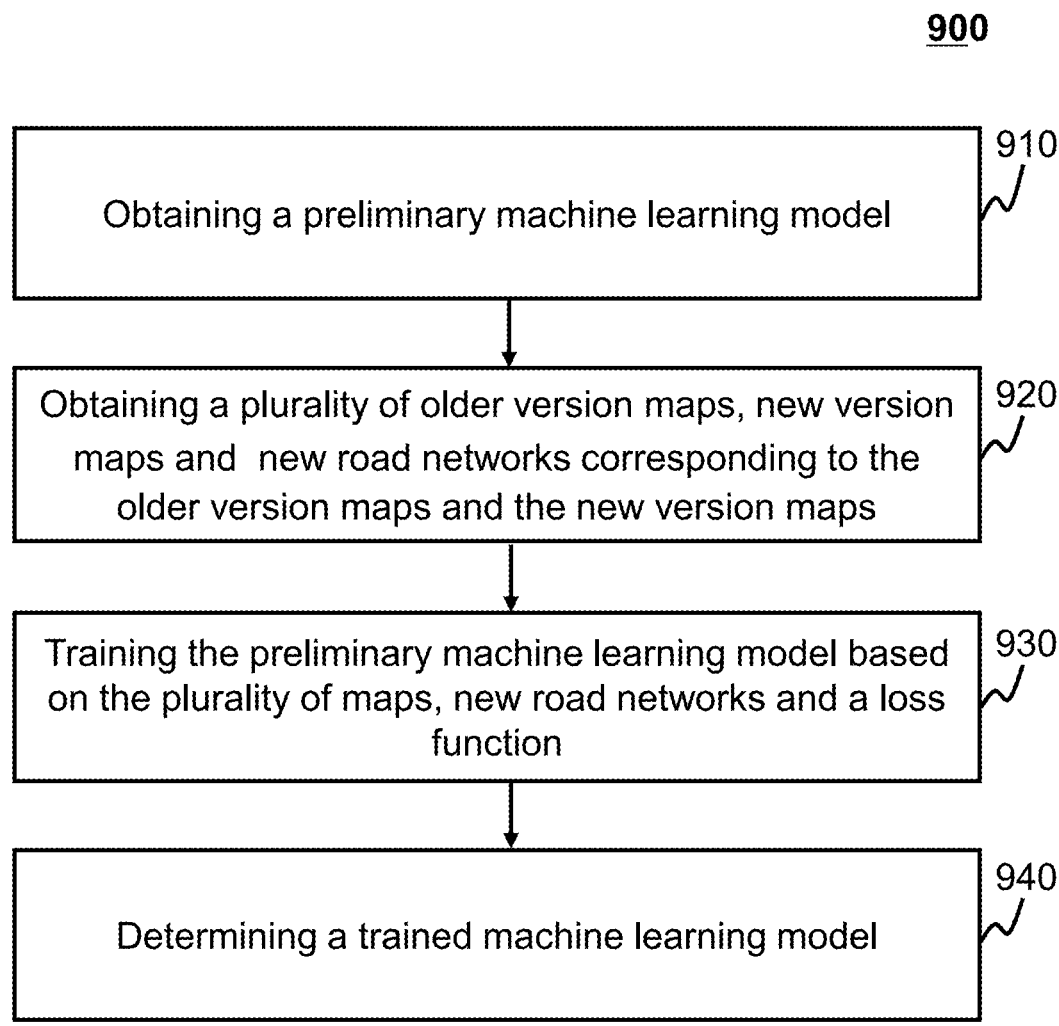
FIG. 9 illustrates an exemplary flowchart for training a machine learning model according to some embodiments of the present disclosure.

FIG. 9 is a flowchart illustrating an exemplary process 900 for training a machine learning model according to some embodiments of the present disclosure. The process 900 may be implemented as a set of instructions in a non-transitory storage medium of the processing engine 112. The processor 220 of the computing device 200 may execute the set of instructions and may perform the steps in the process 900 accordingly.

In 910, a preliminary machine leaning model may be obtained. The preliminary machine leaning model may be obtained by, for example, the acquisition module 410. The preliminary machine leaning model may include but not limited to, a preliminary neural network, one or more layers of a preliminary neural network, or the like. For example, the preliminary machine leaning model may include a preliminary DCNN model or one or more layers of a preliminary neural network model (e.g., one or more convolution layers, one or more deconvolution layers, one or more pooling layers, one or more atrous convolution layers, one or more skip layers, one or more output layers, etc.). The preliminary machine leaning model may have one or more parameters which may be updated or optimized in a training process. The one or more parameters may include, for example, learning rate, regularization item, batch size, weight, and/or multiple parameters of one or more of the plurality of layers.

In 920, a plurality of maps and road network images may be obtained. The plurality of maps and road networks may be obtained by, for example, the acquisition module 410. The acquisition module 410 may obtain or receive the plurality of maps and road networks from a storage device (e.g., the storage 150), a terminal device (e.g., the user terminal 130, the driver device 140, etc.), an external source (e.g., a cloud data center, etc.), or the like. In some embodiments, the acquisition module 410 may obtain or receive a plurality of maps and a plurality of road networks corresponding to the plurality of maps to train a preliminary DCNN model. In some embodiments, the plurality of maps and the corresponding road networks may have a same size. For example, the maps and the corresponding road networks may have a size (e.g., 256×256). In some embodiments, if the maps have different sizes, the map processing system 100 may adjust the size of the maps to a predetermined size, for example, by enlarging or shrinking one or more of the maps. In certain embodiments, the predetermined size may be set by a user, or may be determined according to default settings of the map processing system. In certain embodiments, the predetermined size is the size of one of the maps. In some embodiments, the plurality of maps may include road features of different scenarios. Merely by ways of example, the plurality of maps may include city road maps, street road maps, road maps of a community, road maps of a campus, or the like. In some embodiments, the acquisition module 410 may obtain or receive a plurality of road networks and a plurality of processed road networks corresponding to the plurality of road networks to train one or more layers of a preliminary neural network model (e.g., convolution layer 725 and/or convolution layer 760).

In 930, the preliminary machine learning model may be trained based on the plurality of maps and road networks. The preliminary machine learning model may be trained by, for example, the training unit 520. In the training process, a map or a road network may be input into the preliminary machine learning model. The preliminary machine learning model may output a road network as a processing result. The training module 420, for example, may obtain or receive a road network corresponding to the map or the road network input into the machine learning model, and take the obtained road network as a reference. In some embodiments, the training process may be an iterative process.

In some embodiments, during the training process, the training unit 520 may compare the processing result with the reference, and determine whether a preset condition is satisfied. If the preset condition is satisfied, the process 900 may proceed to 940, and a trained machine learning model may be determined. If the preset condition is not satisfied, another map may be input into the machine learning model, and one or more parameters (e.g., one or more weights) of the machine learning model may be updated based on the input, the processing result, and/or the reference. In some embodiments, the preset condition may relate to a difference between the processing result and the reference. In some embodiments, the preset condition may relate to a restriction (e.g., a threshold for the difference between the processing result and the reference) for an algorithm that when the algorithm satisfies the restriction, the iteration may terminate. For example, the algorithm may be a loss function.

In some embodiments, a loss function may represent a punishment on errors for determining a road on a map as the background of the map (e.g., buildings, blank areas, etc.). In some embodiments, the loss function may be determined according to Equation (1):

$$L = -\Sigma_{i=0}^{1} w_i * \log p_i, \qquad (1)$$

where L may represent the loss function, i may represent a road when i=1, and may represent the background of a map when i=0, $w_i$ may represent a weight. Specifically, $w_1$ may represent the weight of a road, and $w_0$ may represent the weight of the background of a map. In some embodiments, $w_1$ may be larger than $w_0$. In some embodiments, $p_i$ may represent a predicted probability of a road when i=1, and may represent a predicted probability of the background of a map when i=0.

In 940, a trained machine learning model may be determined. In some embodiments, the training process may terminate when a convergence of the loss function is reached in the training process. In some embodiments, the machine learning model that is determined when the training process terminates may be designated as the trained machine learning model. In some embodiments, the trained machine learning model may be used to generate road networks based on maps. For example, a trained DCNN model may be used as the DCNN model 720 with reference to FIG. 7. As another example, one or more trained convolution layers may be used as the convolution layers 725 and 760 with reference to FIG. 7. In some embodiments, the convolution layer 725 and/or the convolution layer 760 may be part of the DCNN model 720.

It should be noted that the above description of process 900 is merely provided for the purposes of illustration, and not intended to limit the scope of the present disclosure. For persons having ordinary skills in the art, multiple variations and modifications may be made under the teachings of the present disclosure. For example, process 900 may further include a validation operation for validating the stability of the trained machine learning model. However, those variations and modifications do not depart from the scope of the present disclosure.

Figure 10:
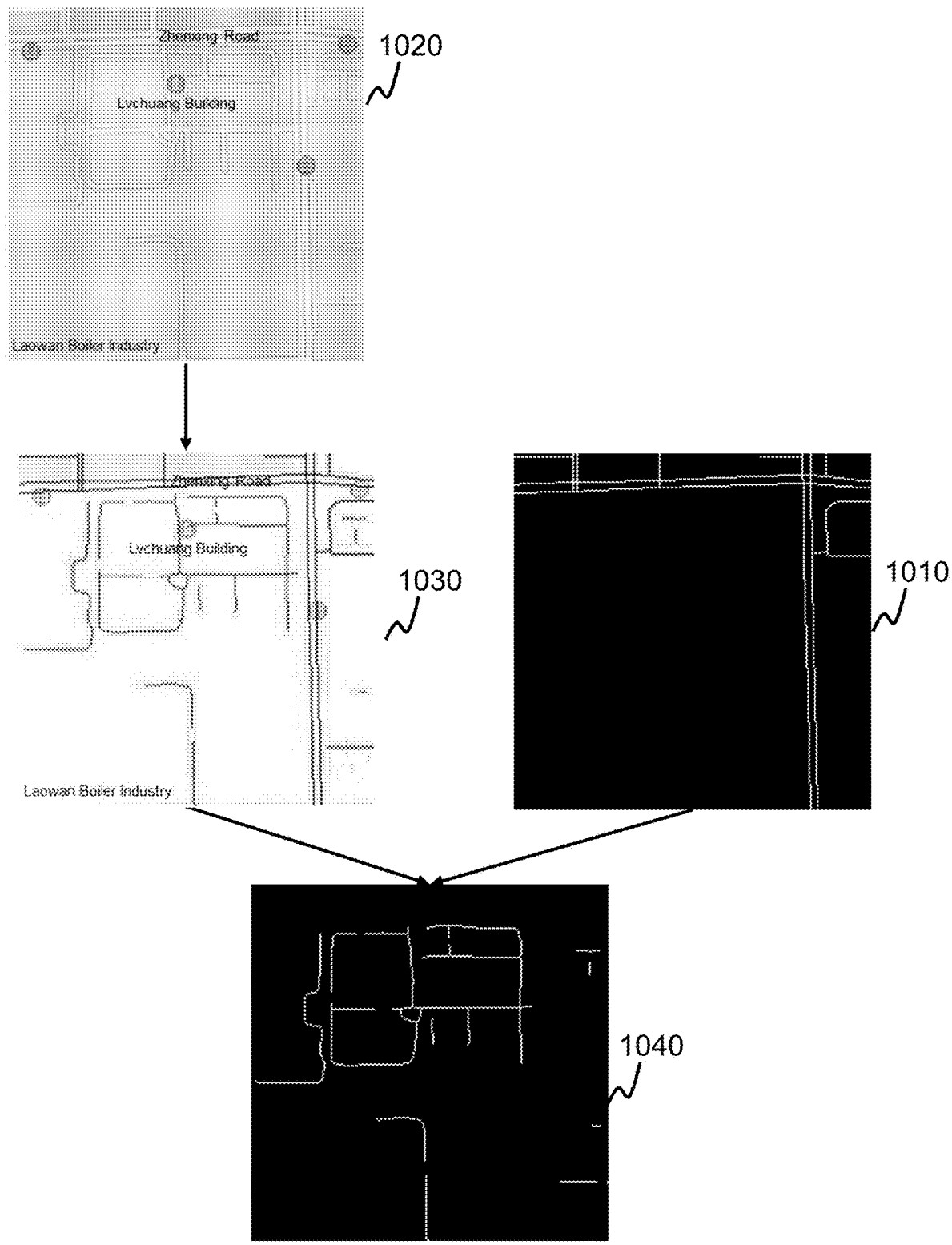
FIG. 10 illustrates a schematic diagram for determining new roads on a map according to some embodiments of the present disclosure.

FIG. 10 illustrates a schematic diagram for determining new roads on a map according to some embodiments of the present disclosure. In some embodiments, FIG. 10 may be described in connection with FIG. 6. As shown in FIG. 10, a first road network image 1010 may be obtained. The first road network image 1010 may include a plurality of roads in a region. In some embodiments, the first road network image 1010 may be generated based on an older version map. In some embodiments, a map 1020 may be obtained, and the map 1020 may be a new version map of the region. The map 1020 may include a plurality of roads and POIs (e.g., buildings, bus stations, etc.) of the region. In some embodiments, one or more of the plurality of roads on the road map 1020 may be new roads (e.g., newly constructed or reconstructed), and the new roads are not present in the first road network image 1010. In certain embodiments, the map 1020 may be input into a trained DCNN model to generate a second road network image 1030. Main features of the road map 1020, such as the roads may be extracted and reserved in the road network image 1030.

In some embodiments, the map processing system 100 may determine a road network image of new roads 1040 based on the first road network image 1010 and the second road network image 1030. In some embodiments, the road network image of new roads 1040 may be obtained by performing one or more processing operations on the first road network image 1010 and the second road network image 1030. The processing operations may include, for example, a concatenation operation, a convolution operation, etc. In some embodiments, a coordinate system may be established, and coordinates of two ends of each new road on the road network image of new roads 1040 may be determined to facilitate identifying the new roads.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more non-transitory computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter lie in less than all features of a single foregoing disclosed embodiment.

We claim:

1. A system for determining new roads on a map, comprising:
    at least one storage medium storing a set of instructions; and
    at least one processor communicating with the at least one storage medium, wherein when executing the set of instructions, the at least one processor is directed to:
        obtain a first road network image of a region, the first road network image including a first plurality of roads;
        determine a second road network image of the region based on a map of the region with a trained deep convolution neural network (DCNN) model, the second road network image including a second plurality of roads that are not present in the first road network image;
        determine a third road network image of the region by concatenating the first road network image and the second road network image, the third road network image including information of the first road network image and the second road network image; and
        determine a fourth road network image of the region by processing the third road network with at least one convolution layer, the fourth road network including the second plurality of roads.

2. The system of claim 1, wherein the at least one processor is further directed to:
    change the first plurality of roads in the first road network image from a first width to a second width, wherein the first plurality of roads and the second plurality of roads in the second road network image have the second width.

3. The system of claim 1, wherein to obtain the trained DCNN model, the at least one processor is directed to:
    obtain a preliminary DCNN model;
    obtain a plurality of maps and a plurality of road network images corresponding the plurality of maps;
    train the preliminary DCNN model based on the plurality of maps and the plurality of road networks; and
    determine the trained DCNN model based on the preliminary DCNN model and a loss function.

4. The system of claim 1, wherein the at least one convolution layer is part of the trained DCNN model.

5. The system of claim 1, wherein the trained DCNN model includes one or more pairs of convolution layer and pooling layer, at least one atrous convolution layer, one or more deconvolution layers, and one or more skip layers.

6. The system of claim 1, wherein the trained DCNN model includes:
    one or more atrous convolution layers configured to improve the resolution of a feature image from a first value to a second value; and
    one or more skip layers configured to combine two feature images into one combined feature image.

7. The system of claim 6, wherein to combine the two feature images into the one combined feature image, the first skip layer is configured to:
    combine the two feature images into the one combined feature image element-by-element.

8. The system of claim 6, wherein the one combined feature image includes features of both the two feature images.

9. The system of claim 1, wherein the size of the second road network image is same as the size of the first road network image.

10. The system of claim 1, wherein to determine the third road network image of the region by concatenating the first road network image and the second road network image, the at least one processor is directed to:
    determine the third road network image by inputting the first road network image and the second road network image into a concatenation layer of the trained DCNN model.

11. The system of claim 1, wherein the at least one processor is further directed to:
    determine two ends of each of the second plurality of roads based on the fourth road network image; and
    determine coordinates of the two ends according to a Hough transform.

12. A method implemented on at least one map processing device that is used to detect objects in images, comprising:
    obtaining, by the at least one map processing device, a first road network image of a region, the first road network image including a first plurality of roads;
    determining, by the at least one map processing device, a second road network image of the region based on a map of the region with a trained deep convolution neural network (DCNN) model, the second road network image including a second plurality of roads that are not present in the first road network image;
    determining, by the at least one map processing device, a third road network image of the region by concatenating the first road network image and the second road network image, the third road network image including information of the first road network image and the second road network image; and determining, by the at least one map processing device, a fourth road network image of the region by processing the third road network with at least one convolution layer, the fourth road network including the second plurality of roads.

13. The method of claim 12, further comprising:
changing, by the at least one map processing device, the first plurality of roads in the first road network image from a first width to a second width, wherein the first plurality of roads and the second plurality of roads in the second road network image have the second width.

14. The method of claim 12, wherein the trained DCNN model is obtained by:
obtaining a preliminary DCNN model;
obtaining a plurality of maps and a plurality of road network images corresponding the plurality of maps;
training the preliminary DCNN model based on the plurality of maps and the plurality of road networks; and
determining the trained DCNN model based on the preliminary DCNN model and a loss function.

15. The method of claim 12, wherein the at least one convolution layer is part of the trained DCNN model.

16. The method of claim 12, wherein the trained DCNN model includes one or more pairs of convolution layer and pooling layer, at least one atrous convolution layer, one or more deconvolution layers, and one or more skip layers.

17. The method of claim 12, wherein the trained DCNN model includes:
one or more atrous convolution layers configured to improve the resolution of a feature image from a first value to a second value; and
one or more skip layers configured to combine two feature images into one combined feature image.

18. The method of claim 12, wherein determining, by the at least one map processing device, the third road network image of the region by concatenating the first road network image and the second road network image includes:
determining, by the at least one map processing device, the third road network image by inputting the first road network image and the second road network image into a concatenation layer of the trained DCNN model.

19. The method of claim 12, further comprising:
determining, by the at least one map processing device, two ends of each of the second plurality of roads based on the fourth road network image; and
determining, by the at least one map processing device, coordinates of the two ends according to a Hough transform.

20. A non-transitory medium storing instructions, the instructions, when executed by at least one map processing device, causing the at least one map processing device to implement a method, comprising:
obtaining a first road network image of a region, the first road network image including a first plurality of roads;
determining a second road network image of the region based on a map of the region with a trained deep convolution neural network (DCNN) model, the second road network image including a second plurality of roads that are not present in the first road network image;
determining a third road network image of the region by concatenating the first road network image and the second road network image, the third road network image including information of the first road network image and the second road network image; and
determining a fourth road network image of the region by processing the third road network with at least one convolution layer, the fourth road network including the second plurality of roads.

* * * * *